United States Patent [19]
Kimura et al.

[11] Patent Number: 6,060,144
[45] Date of Patent: May 9, 2000

[54] HOLLOW PANEL HAVING COVER MATERIAL BONDED THERETO AND PROCESS FOR PRODUCING SAME

[75] Inventors: Isao Kimura, Seto; Minoru Kimura, Iwakura, both of Japan

[73] Assignee: Kyoraku Co., Ltd., Kyoto, Japan

[21] Appl. No.: 09/031,367

[22] Filed: Feb. 26, 1998

[30] Foreign Application Priority Data

Feb. 27, 1997 [JP] Japan ..................................... 9-059779

[51] Int. Cl.[7] ............................ B32B 33/00; D06C 11/00; B27N 3/10
[52] U.S. Cl. .................................. 428/91; 428/72; 428/92; 428/178; 428/188; 52/783.1; 264/257; 264/512; 264/531; 264/546
[58] Field of Search ...................................... 428/178, 120, 428/188, 33, 172, 90, 91, 72, 92, 95, 133; 264/257, 512, 531, 546; 52/783.1

[56] References Cited

U.S. PATENT DOCUMENTS

| | | | |
|---|---|---|---|
| 2,985,968 | 5/1961 | Koch | 428/116 |
| 4,894,974 | 1/1990 | Mayhew et al. | 52/785 |

FOREIGN PATENT DOCUMENTS

| | | |
|---|---|---|
| 4-53696 | 8/1992 | Japan . |
| 6-134842 | 5/1994 | Japan . |
| 2182080 | 5/1987 | United Kingdom . |

*Primary Examiner*—Donald Loney
*Attorney, Agent, or Firm*—Hickman Stephens Coleman & Hughes, LLP

[57] ABSTRACT

A hollow panel having a cover material bonded thereto includes a first wall having an inner surface and a substantially planar outer surface. A second wall opposes the first wall so as to define a hollow space therebetween and has at least one protrusion formed therein. Each protrusion has a tip which is integrally joined to the inner surface of the first wall to form a double-walled rib bridging the hollow space. The double-walled rib has integrally joined opposing walls such that an outer surface of the second wall is substantially planar. The cover material is bonded to the outer surface of the first wall. A process for producing a hollow panel includes placing a cover material having outwardly protruding fuzzy hairs between a first mold half and a first portion of a parison to be formed into a first wall such that the fuzzy hairs face the first mold half, bringing the first mold half and a second mold half having a slide core positioned therein into a closed position, moving said slide core into a cavity defined by the first and second mold halves to form a protrusion in a second portion of the parison to be formed into a second wall, the protrusion having a tip integrally joined to the first portion of the parison, retracting the slide core within the second mold half, and introducing a pressurized gas into the parison such that the parison is pressed against the first and second mold halves to bond the cover material to the first wall without substantial matting of the fuzzy hairs and opposing sides of the protrusion are pressed together to form a double-walled rib.

21 Claims, 4 Drawing Sheets ic # HOLLOW PANEL HAVING COVER MATERIAL BONDED THERETO AND PROCESS FOR PRODUCING SAME

CLAIM FOR FOREIGN PRIORITY

This application claims priority under 35 U.S.C. § 119 based on Japanese Patent Application No. 9-59779 filed on Feb. 27, 1997, which is incorporated herein by reference for all purposes.

BACKGROUND OF THE INVENTION

The present invention relates generally to molded articles and, more particularly, to a panel having a cover material bonded thereto and a process for producing such a panel.

To impart a decorative effect to a plastic panel or to improve the feel of the panel, a cover material, e.g., a fabric, has been bonded to plastic panels used in a variety of applications such as building materials, e.g., walls, partitions, and doors, and automotive parts, e.g., head rests, arm rests, parcel shelves, and cargo floor lid panels. For example, Japanese Patent Publication No. 4-53696 discloses a method for producing a hollow plastic article by blow molding in which a cover material such as a non-woven fabric is bonded to the exterior face of the article. In addition, Japanese Patent Application Laid-Open No. 6-134842 discloses a hollow plastic article in which reinforcing ribs are provided between the constituent walls in such a manner that defects caused by shrinkage or warping do not appear on the exterior face of one of the walls.

Hollow panels having a double-wall structure and a cover material, e.g., a fabric having outwardly protruding fuzzy hairs, bonded to the exterior face of a first wall of the panel are known. These known panels, which include reinforcing ribs formed on the interior face of a second wall having tip faces which are integrally joined to the interior face of the first wall, are formed by a method in which a parison and the cover material are first positioned between two halves of a mold and then the parison is blow molded so that the cover material is simultaneously bonded to the exterior face of the first wall of the panel. One disadvantage associated with this method, however, is that the action in which the tip faces of the reinforcing ribs are pressed against the first wall to form an integral union causes the portions of the cover material which are located above the tip faces to be pressed hard against the surface of the mold cavity. Consequently, this action impairs the appearance of the resultant panel by causing press marks to be formed on the portions of the cover material which are subjected to such hard pressing. In addition, if the cover material is a fabric having outwardly protruding fuzzy hairs, then this action causes matting of the fuzzy hairs, which also further impairs the appearance of the resultant panels. This matting phenomenon is caused by the combination of heat from the parison (which is typically at a temperature of about 200° C.) and the high pressure applied against the fabric (typically about 10 atm.). Another disadvantage associated with this method is that the formation of the ribs leaves a concave indentation in the second wall at the points where the tip faces have been joined to the first wall. As a result, the exterior surface of the second wall is not a continuous flat surface.

In view of the foregoing, what is needed is a panel having a cover material bonded thereto which has an aesthetically pleasing appearance, as well as a process for producing such a panel.

SUMMARY OF THE INVENTION

Broadly speaking, the present invention fills these needs by providing a hollow panel having a cover material bonded thereto which has an aesthetically pleasing appearance. The present invention also provides a process for producing such a hollow panel.

In accordance with one aspect of the present invention, a hollow panel is provided. The hollow panel includes a first wall having an inner surface and a substantially planar outer surface. A second wall opposes the first wall so as to define a hollow space therebetween and has at least one protrusion formed therein. Each protrusion has a tip which is integrally joined to the inner surface of the first wall to form a double-walled rib bridging the hollow space. The double-walled rib has integrally joined opposing walls such that an outer surface of the second wall is substantially planar. A cover material is bonded to the outer surface of the first wall.

The cover material bonded to the outer surface of the first wall is preferably a fabric having outwardly protruding fuzzy hairs. The fabric is preferably comprised of materials such as cotton, hemp, wool, silk, viscose rayon, cupro-ammonium rayon, acetate, rayon, nylon, polyester, acrylic, vinylon, polypropylene, and polyurethane. The first and second walls are preferably comprised of a thermoplastic resin such as polyethylene, polypropylene, ethylene/vinyl acetate copolymers, polyvinyl chloride, ABS (acrylonitrile/styrenelbutadiene), polyamide, polystyrene, polyester, polycarbonate, and modified polyphenylene ether.

In accordance with another aspect of the present invention, a process for producing a hollow panel is provided. A cover material having outwardly protruding fuzzy hairs is placed between a first mold half and a first portion of a parison to be formed into a first wall such that the fuzzy hairs face the first mold half. The first mold half and a second mold half having a slide core positioned therein are then brought into a closed position. Next, the slide core is moved into a cavity defined by the first and second mold halves to form a protrusion in a second portion of the parison to be formed into a second wall. The protrusion has a tip integrally joined to the first portion of the parison. Next, the slide core is retracted within the second mold half. Finally, a pressurized gas, e.g., air, is introduced into the parison such that the parison is pressed against the first and second mold halves to bond the cover material to the first wall without substantial matting of the fuzzy hairs and opposing sides of the protrusion are pressed together to form a double-walled rib.

The slide core is preferably retracted within a time period effective to prevent substantial press marks from being formed in the cover material. This time period is typically within about 10 seconds, and preferably within about 5 seconds. It is further preferred that the slide core is retracted such that the tip of the slide core is substantially flush with a surface of the second mold half which defines the cavity. The opposing sides of the protrusion are preferably pressed together such that the double-walled rib has integrally joined walls and an outer surface of the second wall is substantially planar. The pressurized gas is preferably at a pressure that does not exceed 10 kg/cm² to avoid substantial matting of the fuzzy hairs on the cover material.

The hollow panel of the present invention provides several significant advantages. One such advantage is that the panel has a superior appearance. One reason for such appearance is that no press marks are formed on the cover material bonded to one of the walls of the panel because a relatively small force is used in the formation of the double-walled rib. Another reason for such appearance is that the fuzzy hairs of the cover material are free of any substantial matting because the degree to which the cover material is pressed against the mold is minimized by controlling the pressure of the gas within the parison. Another advantage of the hollow panel of the present invention is that the outer surfaces of both the first and second walls are substantially planar and therefore present continuous flat surfaces. In contrast, in known panels at least one of the walls has a plurality of concave indentations formed therein at the locations where ribs have been formed.

These and other features and advantages of the present invention will become apparent upon reading the following detailed description and studying the various figures of the drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

The preferred embodiments of the present invention will now be described in detail with reference to the accompanying drawings.

Figure 1:
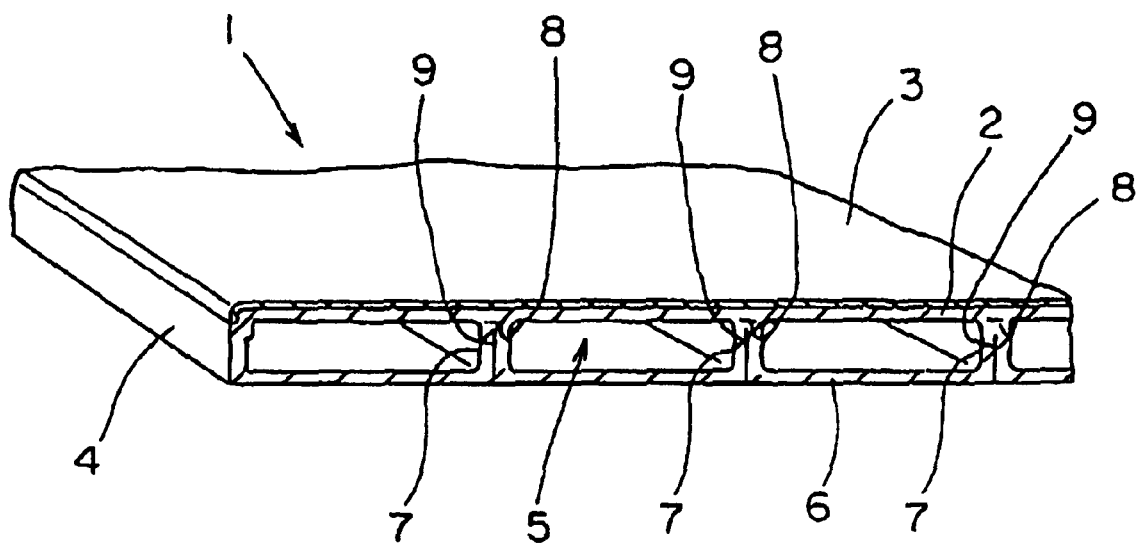
FIG. 1 shows a partial cross-sectional perspective view of a hollow panel having a cover material bonded thereto in accordance with one embodiment of the present invention.

FIG. 1 shows a hollow panel having a cover material bonded thereto in accordance with one embodiment of the present invention. As shown therein, panel 1 has a hollow double-walled structure which includes first wall 2 and second wall 6. Cover material 3 is bonded to the substantially planar outer surface of first wall 2, preferably by means of a blow molding operation which will be described in detail later. As shown in FIG. 1, a portion of cover material 3 overhangs peripheral wall 4. Those skilled in the art will recognize that the degree of overhang, if any, of cover material 3 may be varied to suit the application for which panel 1 is intended. Reference numeral 5 indicates the hollow space between first wall 2 and second wall 6.

Inner ribs 7 bridge hollow space 5 between first wall 2 and second wall 6. Tip faces 8 of ribs 7 are integrally joined to first wall 2 by lateral bonds 9. Ribs 7 may be formed by protruding portions of second wall 6 so that tip faces 8 are brought into contact with first wall 2 with a relatively small force, as will be described in more detail later. The integral joining of first wall 2 and second wall 6 by means of ribs 7 increases the strength and rigidity of panel 1. As shown in FIG. 1, ribs 7 have a double-walled configuration in which the opposing sides of the protrusions formed in second wall 6 have been pressed together. Preferably, the opposing sides of the protrusion formed in second wall 6 are integrally joined so that ribs 7 have a unitary structure and, consequently, second wall 6 has a substantially planar outer surface, as will be described in more detail later.

Panel 1 may be formed of any material capable of being blow molded but is preferably a thermoplastic resin. By way of example, preferred thermoplastic resins include polyethylene, polypropylene, ethylene/vinyl acetate copolymers, polyvinyl chloride, ABS acrylonitrile/butadiene/styrene, polyamide, polystyrene, polyester, and engineering plastics, e.g., polycarbonate and modified polyphenylene ether.

Cover material 3 is preferably a fabric having outwardly protruding fuzzy hairs, e.g., a knitted fabric, a woven fabric, or a non-woven fabric. By way of example, the fabric may be comprised of natural fibers, e.g., cotton, hemp, wool, and silk, regenerated fibers, e.g., viscose rayon and cupro-ammonium rayon, semi-synthetic fibers, e.g., acetate and rayon, synthetic fibers, e.g., nylon, polyester, acrylic, vinylon, polypropylene, and polyurethane, and blends of these fibers. The fabric is preferably raised or sheared so that the fuzzy hairs protrude in a direction perpendicular to the direction of the spread of the fabric.

The hollow panel of the present invention is suitable for use in a variety of applications, e.g., building applications and automotive applications. By way of example, in building applications, the hollow panel may be used as an interior wall, a partition, or a door. By way of example, in automotive applications, the hollow panel may be used as a head rest, an arm rest, rear parcel shelves, or cargo floor lid panels.

Figure 2:
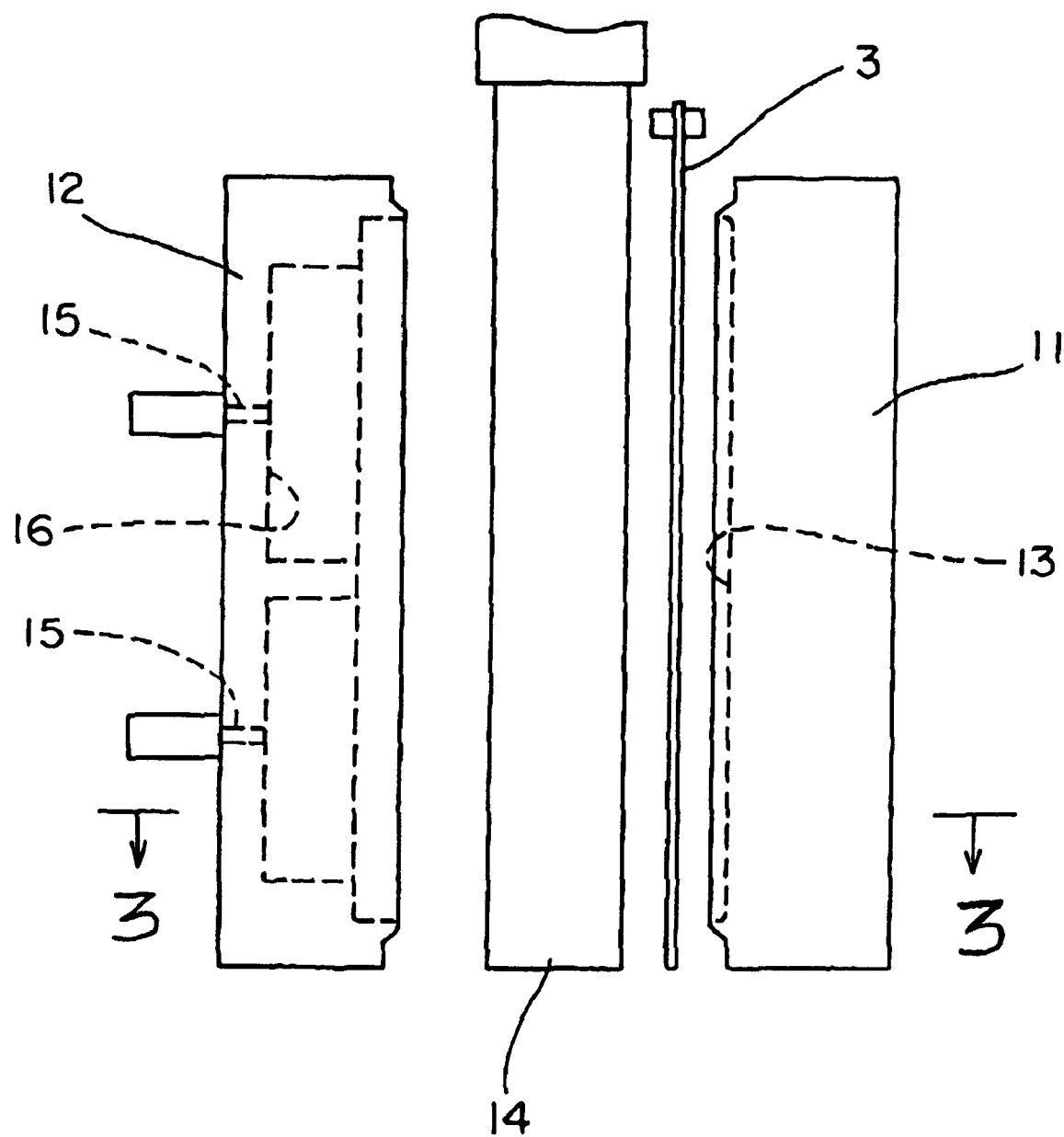
FIG. 2 shows a partially cutaway elevational view of a mold which illustrates one embodiment of the process for producing a hollow panel of the present invention.
Figure 3:
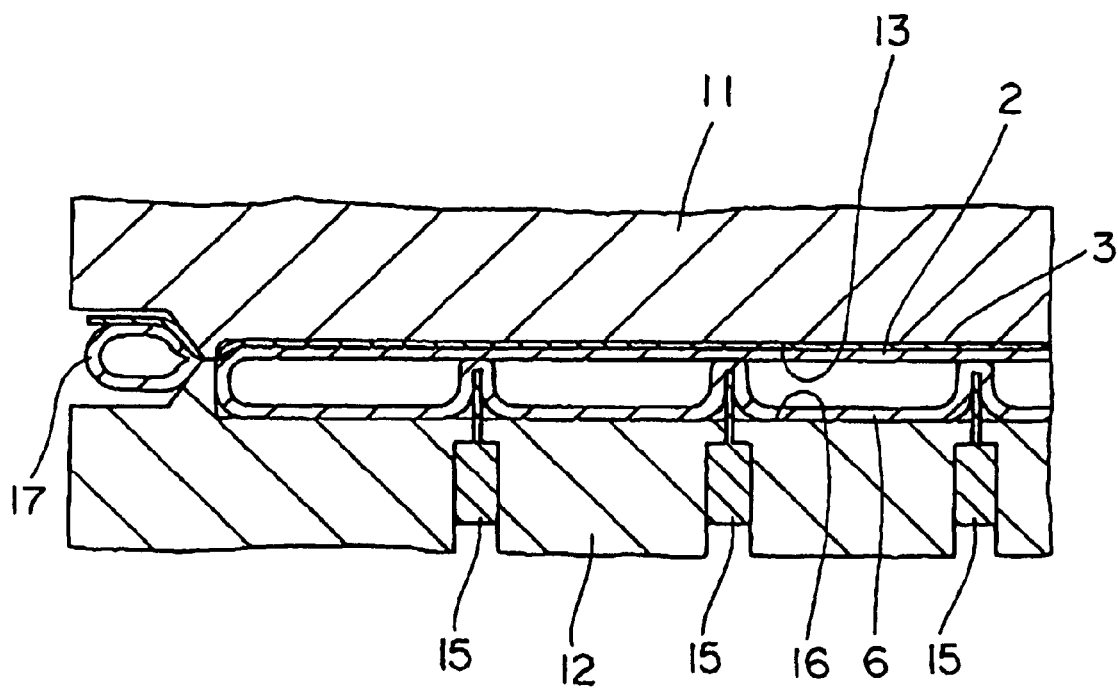
FIG. 3 is an enlarged cross-sectional view taken along line 3—3 in FIG. 2 which illustrates the state where the mold is in the closed position and the slide cores are protruded.

The process for producing a hollow panel of the present invention will now be described with reference to FIGS. 2–4. FIG. 2 shows mold halves 11 and 12 in an open state. Cover material 3, e.g., a fabric having outwardly protruding fuzzy hairs, is positioned between cavity 13 of mold half 11 and parison 14 so that the fuzzy hairs face cavity 13. Slide core 15 is slidably disposed in mold half 12 so that it can be protruded into and retracted from cavity 16 of mold half 12.

At the outset of the blow molding operation, mold halves 11 and 12 are moved into a closed state. When the mold is closed, the interior of parison 14 is hermetically sealed from the exterior by means of the pinch-off edges formed on the periphery of cavity 13 and cavity 16. The formation of the pinch-off edges results in the formation of flashing 17. In addition, cover material 3 is positioned between the portion of parison 14 which will become first wall 2 and cavity 13. Then, as illustrated in FIG. 3, slide cores 15 are protruded from mold half 12 in the direction of cavity 16 so that parts of the portion of parison 14 which becomes second wall 6 are formed into protrusions. Slide cores 15 preferably cause the tips of such protrusions to just barely contact the portion of parison 14 which becomes first wall 2 with a relatively small force that does not result in the formation of press marks on cover material 3. When the tip faces of the protrusions contact the portion of parison 14 which becomes first wall 2, the tip faces are integrally joined thereto (see tip faces 8 in FIGS. 1 and 4).

Next, slide cores 15 are retracted within mold half 12. Preferably, slide cores 15 are retracted such that the tips of slide cores 15 are substantially flush with the surface of mold half 12 which defines cavity 16. This alignment of slide cores 15 ensures that the outer surface of second wall 6 will be substantially planar and free of defects. Slide cores 15 are preferably retracted within a relatively short time period effective to prevent substantial matting of the outwardly protruding fuzzy hairs on cover material 3. It has been found that retracting the slide cores within about 10 seconds, and preferably within about 5 seconds, effectively avoids any substantial matting of the fuzzy hairs on the cover material.

Figure 4:
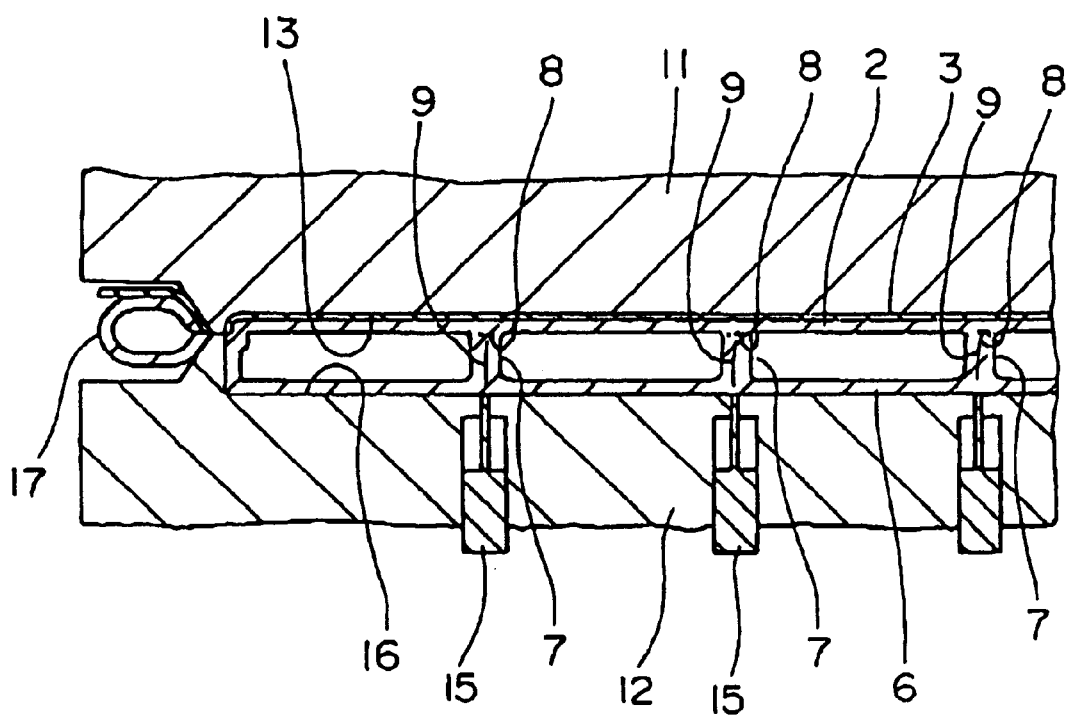
FIG. 4 is an enlarged cross-sectional view taken along line 3—3 in FIG. 2 which illustrates the state where the mold is in the closed position and the slide cores are retracted.

Finally, as illustrated in FIG. 4, a pressurized gas is introduced into parison 14. The pressurized gas, e.g., air, increases the pressure within parison 14 and thereby expands parison 14 against cavity 13 and cavity 16. This causes the portion of parison 14 which becomes first wall 2 to be pressed against cover material 3 and, consequently, the side of cover material 3 which does not have fuzzy hairs protruding therefrom is heated and thereby bonded to first wall 2. Meanwhile, the increased pressure within parison 14 presses the opposing sides of the protrusions formed in the portion of parison 14 which becomes second wall 6 together so that such opposing sides are integrally joined. As a result, ribs 7 have a doublewalled configuration such as shown in either FIG. 1 or FIG. 4.

To prevent matting of the fuzzy hairs on cover material 3, the pressure of the pressurized gas preferably does not exceed 10 kg/cm$^2$. It has been found that when the pressure of the pressurized gas does not exceed 10 kg/cm$^2$, cover material 3 is not pressed against first wall 2 hard enough to cause substantial matting of the fuzzy hairs thereon. Consequently, the appearance of the cover material after the blow molding operation is essentially unchanged from its original appearance.

While this invention has been described in terms of several preferred embodiments, there are alterations, permutations, and equivalents which fall within the scope of this invention. It should also be noted that there are many ways of implementing the hollow panel and process for producing a hollow panel of the present invention. It is therefore intended that the following claims be interpreted as including all such alterations, permutations, and equivalents as fall within the true spirit and scope of the present invention.

What is claimed is:

1. A hollow panel, comprising:

a first wall having an inner surface and a substantially planar outer surface;

a second wall opposing said first wall so as to define a hollow space therebetween, said second wall having at least one protrusion formed therein, said at least one protrusion having a tip which is integrally joined to said inner surface of said first wall to form a double-walled rib bridging said hollow space, said double-walled rib having integrally joined opposing walls such that an outer surface of said second wall is substantially planar;

a cover material bonded to said outer surface of said first wall; and said cover material is a fabric having outwardly protruding fuzzy hairs.

2. The hollow panel of claim 1, wherein said fabric is comprised of a material selected from the group consisting of cotton, hemp, wool, and silk.

3. The hollow panel of claim 1, wherein said fabric is comprised of a material selected from the group consisting of viscose rayon and cupro-ammonium rayon.

4. The hollow panel of claim 1, wherein said fabric is comprised of a material selected from the group consisting of acetate and rayon.

5. The hollow panel of claim 1, wherein said fabric is comprised of a material selected from the group consisting of nylon, polyester, acrylic, vinylon, polypropylene, and polyurethane.

6. The hollow panel of claim 1, wherein the first and second walls are comprised of a thermoplastic resin selected from the groups consisting of polythylene, polyporpylene, ethylene/vinyl acetate copolymers, polyvinyl chloride, acrylonitrile/styrene/butadiene, polyamide, polystyrene, polyester, polycarbonate, and modified polyphenylene ether.

7. The hollow panel of claim 1, wherein said outwardly protruding fuzzy hairs are free of any substantial matting.

8. A process for producing a hollow panel, comprising:

placing a cover material having outwardly protruding fuzzy hairs between a first mold half and a first portion of a parison to be formed into a first wall such that said fuzzy hairs face said first mold half;

bringing said first mold half and a second mold half having a slide core positioned therein into a closed position;

moving said slide core into a cavity defined by said first and second mold halves to form a protrusion in a second portion of said parison to be formed into a second wall, said protrusion having a tip integrally joined to said first portion of said parison;

retracting said slide core within said second mold half; and introducing a pressurized gas into said parison such that said parison is pressed against said first and second mold halves to bond said cover material to said first wall without substantial matting of said fuzzy hairs and opposing sides of said protrusion are pressed together to form a double-walled rib.

9. The process of claim 8, wherein the slide core is retracted within a time period effective to prevent substantial press marks from being formed in the cover material.

10. The process of claim 8, wherein the slide core is retracted within about 10 seconds.

11. The process of claim 8, wherein the pressurized gas is at a pressure that does not exceed 10 kg/cm$^2$.

12. The process of claim 8, wherein the slide core is retracted such that the tip of the slide core is substantially flush with a surface of the second mold half which defines the cavity.

13. The process of claim 8, wherein the opposing sides of the protrusion are pressed together such that the double-walled rib has integrally joined walls and an outer surface of the second wall is substantially planar.

14. The process of claim 8, wherein the parison is comprised of a thermoplastic resin selected from the group consisting of polyethylene, polypropylene, ethylene/vinyl acetate copolymers, polyvinyl chloride, acrylonitrile/styrene/butadiene, polyamide, polystyrene, polyester, polycarbonate, and modified polyphenylene ether.

15. The process of claim 8, wherein the hollow panel is one of the group consisting of a wall, a partition, a door, a head rest, an arm rest, a shelf, and a cargo floor lid panel.

16. The process of claim 8, wherein the cover material is a fabric having outwardly protruding fuzzy hairs.

17. The process of claim 16, wherein the fabric is comprised of a material selected from the group consisting of cotton, hemp, wool, and silk.

18. The process of claim 16, wherein the fabric is comprised of a material selected from the group consisting of viscose rayon and cupro-ammonium rayon.

19. The process of claim 16, wherein the fabric is comprised of a material selected from the group consisting of acetate and rayon.

20. The process of claim 16, wherein the fabric is comprised of a material selected from the group consisting of nylon, polyester, acrylic, vinylon, polypropylene, and polyurethane.

21. A hollow panel, comprising:

a first wall formed of a material and having an inner surface and a substantially planar outer surface;

a second wall opposing said first wall so as to define a hollow space therebetween, said second wall being formed of said same material as said first wall and having at least one protrusion formed therein, said at least one protrusion having a tip which is integrally joined to said inner surface of said first wall to form a double-walled rib bridging said hollow space, said double-walled rib having integrally joined opposing walls such that an outer surface of said second wall is substantially planar;

a cover material bonded to said outer surface of said first wall; and said cover material is a fabric having outwardly protruding fuzzy hairs.

* * * * *